(12) United States Patent  
Hatzirallis (10) Patent No.: US 11,077,471 B1  
(45) Date of Patent: Aug. 3, 2021

(54) MICR-EMBEDDED CLEANING CARD FOR CHECK-READING MACHINES

(71) Applicant: Wells Fargo Bank, N.A., San Francisco, CA (US)

(72) Inventor: Steve Hatzirallis, Orinda, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 175 days.

(21) Appl. No.: 16/227,566

(22) Filed: Dec. 20, 2018

Related U.S. Application Data (62) Division of application No. 14/851,035, filed on Sep. 11, 2015, now Pat. No. 10,201,838.

(51) Int. Cl.
| | | |
|---|---|---|
| *B08B 1/00* | (2006.01) | |
| *G11B 5/41* | (2006.01) | |
| *G06K 9/00* | (2006.01) | |

(52) U.S. Cl.
CPC .......... *B08B 1/006* (2013.01); *G06K 9/00402* (2013.01); *G11B 5/41* (2013.01)

(58) Field of Classification Search
CPC .... G06K 7/084; G06K 9/00402; B08B 1/006; G11B 5/41
See application file for complete search history.

(56) References Cited

U.S. PATENT DOCUMENTS

| | | |
|---|---|---|
| 5,438,186 A | 8/1995 | Nair et al. |
| 5,832,556 A | 11/1998 | Eyler |
| 5,932,868 A | 8/1999 | Mccall et al. |
| 6,210,490 B1 | 4/2001 | Michael et al. |
| 6,243,908 B1 | 6/2001 | Battle et al. |
| 6,328,207 B1 | 12/2001 | Gregoire et al. |
| 7,732,040 B2 | 6/2010 | Klein et al. |
| 7,922,098 B1 * | 4/2011 | Ma ..................... G06Q 20/1085 235/493 |
| 8,323,779 B2 | 12/2012 | Bailey et al. |
| 10,201,838 B1 | 2/2019 | Hatzirallis et al. |

(Continued)

FOREIGN PATENT DOCUMENTS

JP 63225910 A 9/1988

OTHER PUBLICATIONS

"U.S. Appl. No. 14/851,035, Examiner Interview Summary dated Aug. 2, 2017", 4 pgs.

(Continued)

*Primary Examiner* — Nay A Maung  
*Assistant Examiner* — Jose M Torres  
(74) *Attorney, Agent, or Firm* — Schwegman, Lundberg & Woessner, P.A.

(57) ABSTRACT

An example cleaning card for cleaning a check-reading machine can include at least two opposing surfaces. The opposing surfaces can include a cleaning feature configured to clean at least one component of the check-reading machine when the cleaning card is fed through the check-reading machine. An ink can be located on at least one of the opposing surfaces. The ink can define a set of Magnetic Ink Character Recognition (MICR) characters capable of identifying the cleaning card. The position of the set of MICR characters can coincide with a routing field of the cleaning card as defined in accordance with the standard of the American National Standards Institute (ANSI) X9 family of standards. Other systems, apparatuses, and methods are also described.

18 Claims, 6 Drawing Sheets

(56) References Cited

U.S. PATENT DOCUMENTS

| | | |
|---|---|---|
| 2005/0210610 A1 | 9/2005 | Louie et al. |
| 2005/0281449 A1 | 12/2005 | Takiguchi |
| 2006/0019072 A1 | 1/2006 | Bailey et al. |
| 2006/0212391 A1 | 9/2006 | Norman et al. |
| 2007/0026198 A1 | 2/2007 | Bouchard et al. |
| 2007/0084911 A1 | 4/2007 | Crowell |
| 2007/0219904 A1* | 9/2007 | Kurrasch ............... G06Q 40/02 705/40 |
| 2010/0296719 A1* | 11/2010 | Williamson ............ G07D 7/12 382/137 |
| 2016/0171361 A1 | 6/2016 | Chatterton et al. |

OTHER PUBLICATIONS

"U.S. Appl. No. 14/851,035, Final Office Action dated Jun. 20, 2018", 10 pgs.

"U.S. Appl. No. 14/851,035, Non Final Office Action dated Jun. 2, 2017", 13 pgs.

"U.S. Appl. No. 14/851,035, Non Final Office Action dated Dec. 14, 2017", 8 pgs.

"U.S. Appl. No. 14/851,035, Notice of Allowance dated Oct. 3, 2018", 8 pgs.

"U.S. Appl. No. 14/851,035, Response filed Feb. 28, 2017 to Restriction Requirement dated Dec. 30, 2016", 8 pgs.

"U.S. Appl. No. 14/851,035, Response filed Mar. 13, 2018 to Non Final Office Action dated Dec. 14, 2017", 7 pgs.

"U.S. Appl. No. 14/851,035, Response filed Sep. 5, 2017 to Non Final Office action dated Jun. 2, 2017", 8 pgs.

"U.S. Appl. No. 14/851,035, Response filed Sep. 20, 2018 to Final Office Action dated Jun. 20, 2018", 5 pgs.

"U.S. Appl. No. 14/851,035, Restriction Requirement dated Dec. 30, 2016", 6 pgs.

"Panini Waffletechnology Check Scanner Cleaning Card, 15 cards/box", POS Supply Solutions, [Online]. Retrieved from the Internet: <URL:http://www.possupply.com/panini-waffletechnology-check-scanner-cleaning-card-15-cards-box, (Accessed on Jul. 13, 2015), 6 pgs.

"U.S. Appl. No. 16/227,596, Non Final Office Action dated Aug. 31, 2020", 14 pgs.

"U.S. Appl. No. 16/227,596, Preliminary Amendment filed Jan. 23, 2019", 6 pgs.

"U.S. Appl. No. 16/227,596, Response filed Nov. 25, 2020 to Non Final Office Action dated Aug. 31, 2020", 10 pgs.

"U.S. Appl. No. 16/227,596, Notice of Allowance dated Mar. 26, 2021", 8 pgs.

"U.S. Appl. No. 16/227,596, Supplemental Notice of Allowability dated Jun. 18, 2021", 2 pgs.

\* cited by examiner

MICR-EMBEDDED CLEANING CARD FOR CHECK-READING MACHINES

CROSS-REFERENCE TO RELATED APPLICATION

This application is a division of U.S. patent application Ser. No. 14/851,035, filed Sep. 11, 2015, which is incorporated by reference herein in its entirety.

BACKGROUND

Check-reading machines include reading mechanisms that can receive a card or other document and read data printed thereon. Cleaning cards are used to periodically clean magnetic sensors, optical lenses or other sensitive components of the reading mechanisms. However, operators do not necessarily perform cleaning operations at sufficient intervals to maintain reading mechanisms in good working order.

DETAILED DESCRIPTION

Systems and methods disclosed herein relate to cleaning cards for check-reading machines. Check-reading machines can include reading mechanisms of the type intended to receive an operating card or other paper document for actuating the operation of a machine, and to read data on the operating card or other paper document. In many reading mechanisms, internal surfaces are spaced apart a distance greater than the permissible thickness of the operating card or other document to be read. Thereby the operating card is kept out of contact with those internal surfaces, particularly internal surfaces of sensing mechanisms (e.g., surfaces of magnetic sensors, optical lenses, etc.) and other surfaces defining the internal cavity of the reading mechanism.

Generally, available cleaning cards traverse the same path as the operating cards or other documents to be read. These cards are typically of a thickness that they can be received in the reading mechanism for the purposes of cleaning internal surfaces thereof, and these cards are comprised of a material that can effectuate cleaning operations (e.g., a cloth). However, available cleaning cards do not include any mechanism or data that operators can use to track usage of cleaning cards. Accordingly, in some uses, the check-cleaning machines may not receive sufficient maintenance, within sufficient intervals, to ensure good operating performance.

Embodiments provide a cleaning card, embedded with a tracking mechanism such as printed characters, that to allows a check reader or externally-connected system to determine when the cleaning card was run. This allows operators to avoid potential jams, to improve availability of the device, and to reduce maintenance costs associated with check readers.

Figure 1:
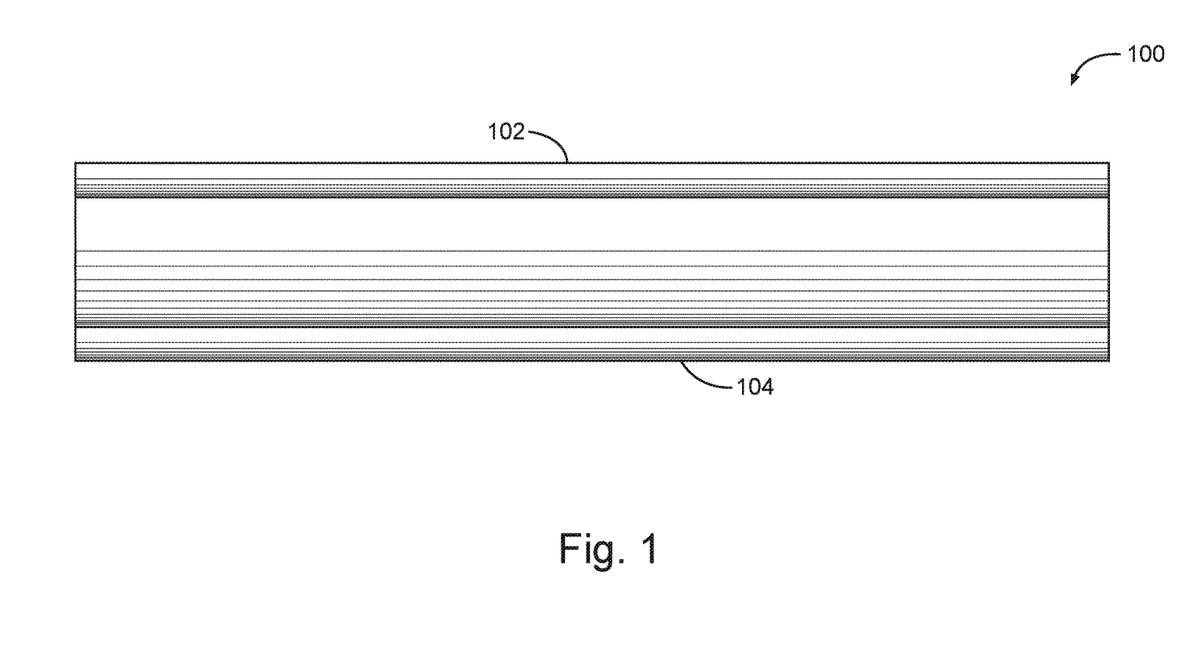
FIG. 1 illustrates a cross-sectional view of a cleaning card, according to an example embodiment.
Figure 3:
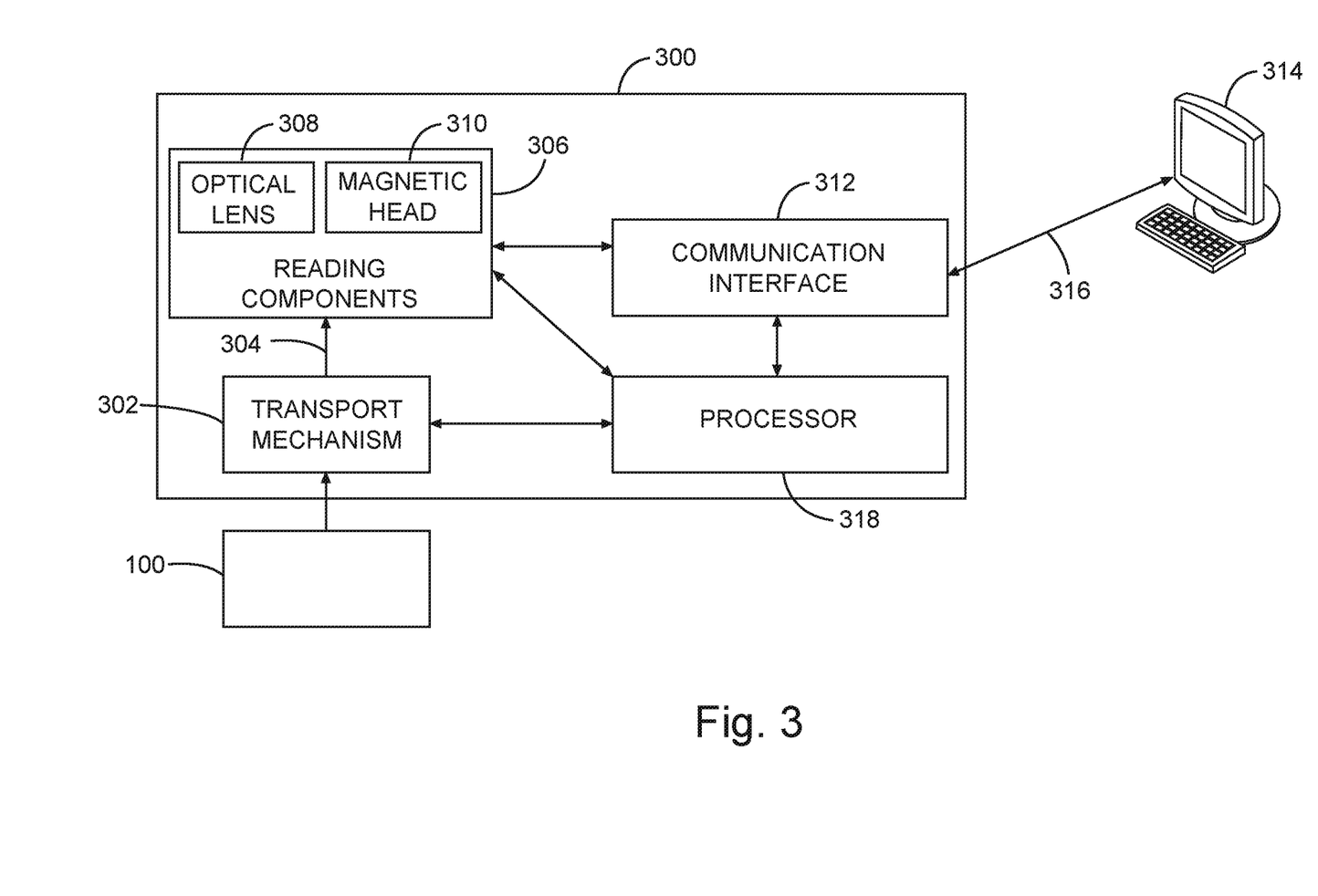
FIG. 3 illustrates a block diagram of a system in which any one or more of the techniques (e.g., methodologies) discussed herein can be performed, according to an example embodiment.

FIG. 1 illustrates a cross-sectional view of a cleaning card 100, according to an example embodiment. The cleaning card 100 can be used for cleaning a check-reading machine 300 (FIG. 3). The cleaning card 100 includes at least two opposing surfaces 102 and 104. The opposing surfaces 102, 104 are configured to clean at least one component of the check-reading machine 300 when the cleaning card 100 is fed through the check-reading machine 300 as described in more detail later herein. The component can include, for example, an internal surface, an optical lens or other glass surface, a magnetic head, etc.

Figure 2A:
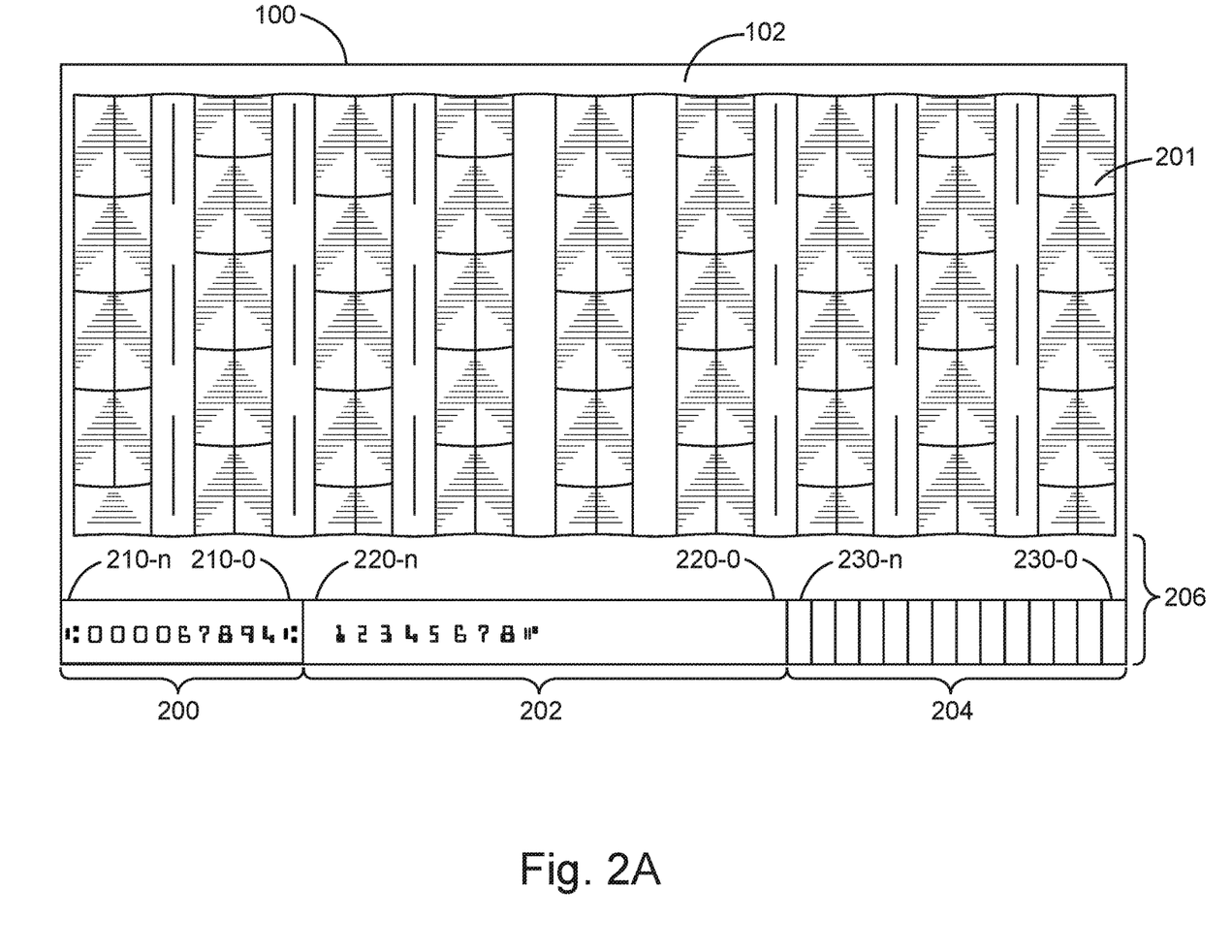
FIG. 2A illustrates a front view of a cleaning card, according to an example embodiment.
Figure 2B:
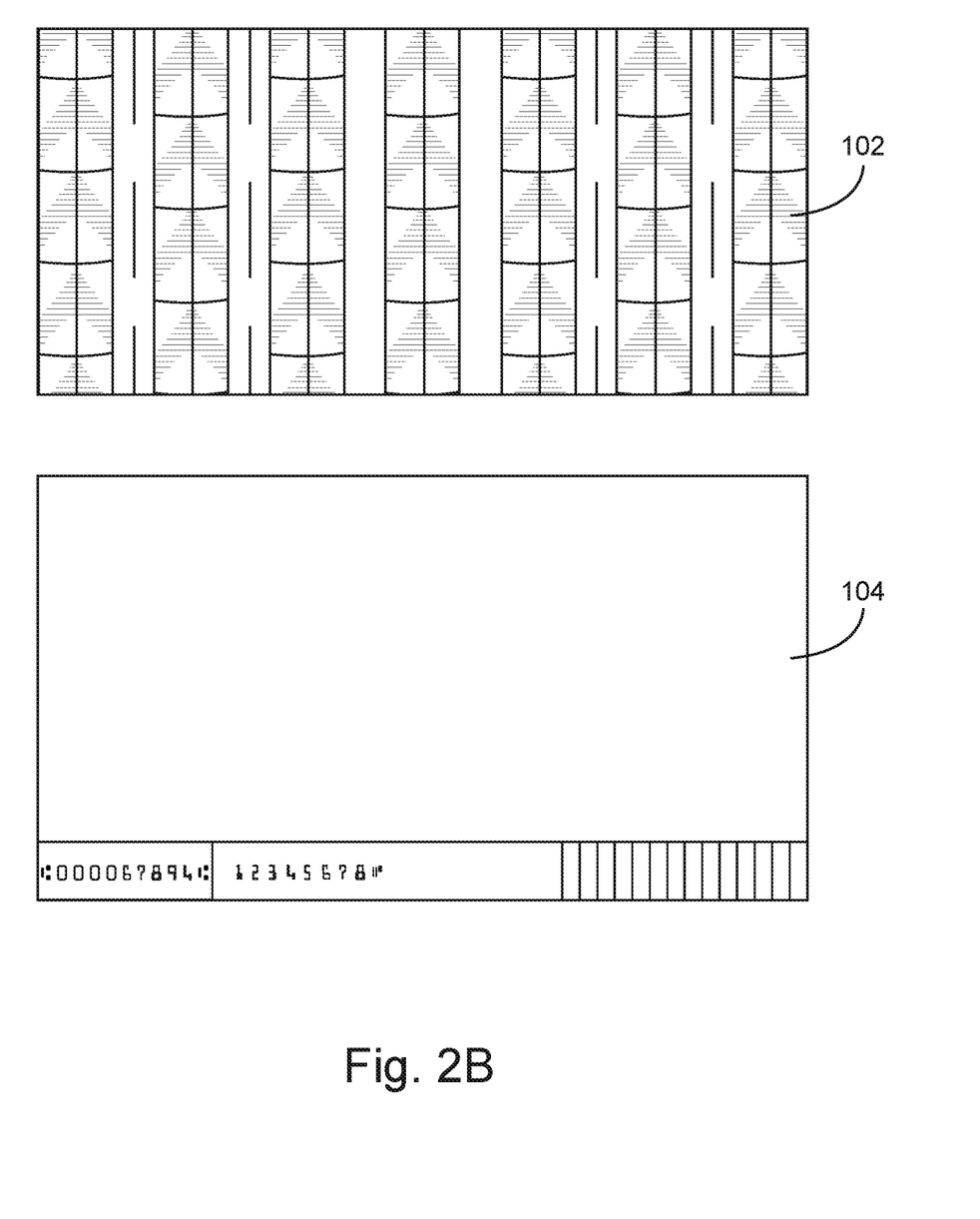
FIG. 2B illustrates a front view of a first surface of a cleaning card and a front view of a second surface of the cleaning card, according to an example embodiment.

FIG. 2A illustrates a front view of the cleaning card 100, according to an example embodiment. The cleaning card 100 includes a portion 201 that performs cleaning functions and a portion 206 that does not perform cleaning functions. In some embodiments, an ink is deposited on at least one of the opposing surfaces 102, 104. In some embodiments, the ink is deposited on a portion 206 of the cleaning card 100 that does not perform cleaning functions, although embodiments are not limited thereto. In some embodiments, for example as illustrated in FIG. 2B, one opposing surface 104 includes the ink without including a cleaning feature, while the other opposing surface 102 includes a cleaning feature but no ink.

In embodiments, the ink can include a magnetic ink, although embodiments are not limited to magnetic ink and any type of ink that can be read by an optical character recognition (OCR) system can be used.

Referring again to FIG. 2A, in embodiments, the ink defines a set 210-0 through 210-$n$ of Magnetic Ink Character Recognition (MICR) characters. In an example, the MICR characters form a string that cannot be interpreted as financial institute codes, for example, the set 210-0 through 210-$n$ can include a value "010101010," which is known or understood to not be used as a routing number by financial institutions. The set 210-0 through 210-$n$ of MICR characters identifies the cleaning card 100 to outside systems as being a cleaning card, as opposed to another type of document (e.g., a check). In embodiments, the position of the set 210-0 through 210-$n$ of MICR characters coincides with a routing field 200 of the cleaning card 100 as defined in accordance with a standard of the American National Standards Institute (ANSI) X9 family of standards. In some examples, these fields are defined according to the ANS-X9.100-160-1-2004 MICR specification, or later versions thereof.

Ink can be printed or deposited on the cleaning card 100 in various ways in different embodiments. For example, in embodiments in which magnetic ink is used, the magnetic ink can be printed or deposited on the cleaning card 100 using a specialized MICR printer that can include, for example, off-set printers using MICR paste, laser printers utilizing MICR toner, or daisy-wheel or dot-matrix printers using MICR ribbon. In still other embodiments, ink can be transferred onto the cleaning card 100 using adhesives, decals, or other textile-printing or dyeing techniques.

Embodiments are not limited to use of MICR characters as tracking mechanisms for identifying the cleaning card 100. On the contrary, other identification can be used, such as magnetic stripes, bar codes, radio frequency identifier (RFID) tags, contactless smart card devices such as embedded integrated circuits for communicating with other system components via radio waves, non-MICR characters, etc.

Embodiments can also provide a solution that permits operators to identify each cleaning card 100 to permit tracking of how many times a particular cleaning card 100 has been used. Embodiments can identify each cleaning card 100 based on a cleaning card 100 specific identity, such as a serial number, included as at least one other set 220-0 through 220-$n$ of MICR characters deposited at another position on the same or different opposing surface 102, 104 as the first set 210-0 through 220-$n$. The position of this other set can coincide with an ON-US field 202 as defined in accordance with a standard of the ANSI X9 family of standards. For example, referring to FIG. 2A, the value "00000000" can be included in the ON-US field 202 of a first cleaning card 100, and a second value "00000001" can be included in the ON-US field of a second cleaning card 100, to identify two different cleaning cards 100. Operators can then track the number of times each of these cleaning cards 100 was used in order to, for example, determine when cleaning cards 100 should be disposed of, recycled, etc.

Alternatively, or additionally, either the routing field 200 or the ON-US field 202 can be used to identify the type of component cleaned by a particular cleaning card 100. Therefore, in some examples, a first set of numerals can be used in the routing field 200 to indicate that magnetic heads were cleaned by the corresponding cleaning card 100, while the ON-US field 202 can be used as a serial number for that corresponding cleaning card 100. In still other examples, two sets of numerals within the routing field 200 separated by a hyphen or space, for example, can identify the type of component cleaned as well as the serial number for the corresponding cleaning card 100. For example, the routing field 200 can include a value "001-0001" with the first group of numerals indicating the type of component cleaned, and the second set of numerals indicating a serial number for the corresponding cleaning card 100. However, it will be understood that embodiments are not limited to any particular number of groups or subfields within the routing field 200 or the ON-US field 202, or to any particular meaning being given to these groups or subfields.

While two sets of MICR characters are shown, the cleaning card 100 can include other data not described herein. Furthermore, the cleaning card 100 can include one of the sets, but not the other, of MICR characters.

FIG. 3 illustrates a block diagram of a system in which any one or more of the techniques (e.g., methodologies) discussed herein can be performed, according to an example embodiment. As shown in FIG. 3, a check-reading machine 300 includes a transport mechanism 302, which can receive a cleaning card 100 and feed the cleaning card 100 along a transport path 304 to reading components 306. The reading components 306 can detect a set of MICR characters, which together form a string representing a value (e.g., "00000000" as described earlier herein) that have been printed on the cleaning card 100. The reading components 306 can include a glass component such as optical lens 308 for reading MICR characters optically and interpreting the MICR characters using optical character recognition (OCR). Additionally or alternatively, the reading components 306 can include a magnetic head 310, or any other component adaptable to read characters or other information from a document such as a check. Additionally or alternatively, the reading components 306 can include wired or wireless receivers, antennas, magnetic stripe readers, or other components suitable for detecting RFID tags, contact or contactless smart card circuits, etc. In various embodiments, the reading components 306 can be housed separately from other components of the check-reading machine 300. For example, in embodiments in which the cleaning card 100 includes an RFID tag or contactless smart card devices, reading components 306 can include a receiver separate from the check-reading machine for receiving signals from the RFID tag or integrated circuit embedded on the cleaning card 100.

The opposing surfaces 102, 104 of the cleaning card 100 can clean a glass machine component of the check-reading machine 300, for example, the optical lens 308 of the check-reading machine 300. Additionally or in the alternative, the opposing surfaces 102, 104 can clean other components such as a magnetic head 310 of the check-reading machine 300.

The check-reading machine 300 can include a communication interface 312. In response to the reading components 306 detecting a set of MICR characters, the check-reading machine 300 can use the communication interface 312 to transmit the set of MICR characters to an external device, such as a machine 314. The communication interface 312 can use a connection 316, wherein the connection 316 can include one or more of a Universal Serial Bus (USB) and/or an Ethernet wired connections with the machine 314, or a Wireless Fidelity (Wi-Fi), Wi-Fi Direct or Bluetooth wireless connections. It should be understood that other types of interfaces can be implemented. Therefore, the check-reading machine 300 can be addressable through an Internet Protocol (IP) address, and configurable by the machine 314. The machine 314 can control the check-reading machine 300 using a protocol such as the Hyper Text Transfer Protocol (HTTP), or encrypted HTTP (HTTPS) by addressing the check-reading machine 300 using its IP address.

The check-reading machine 300 can also include at least one processor 318 (e.g., a central processing unit (CPU), a graphics processing unit (GPU), a digital signal processor (DSP), an application specific integrated circuit (ASIC), a radio-frequency integrated circuit (RFIC), or any suitable combination thereof). The processor 318 can manage the communication interface 312, the reading components 306, the transport mechanism 302, or any other check-reading machine 300 components in accordance with various embodiments. Instructions (e.g., software), embodying any one or more of the methodologies or functions described herein, can be stored on the processor 318 or other memory (not shown) during execution thereof by the check-reading machine 300. Accordingly, the processor 318 or other memory can be considered as machine-readable media.

In some embodiments, the processor 318 can provide parsing, processing, filtering or interpreting of characters captured by the reading components 306 (e.g., the optical lens 308 or the magnetic head 310). For example, in some embodiments, the processor 318 can parse strings of MICR characters. In other embodiments, the processor 318 provides these MICR characters to external systems without having performed further processing on the characters or other data collected by the reading components 306. In embodiments, the check-reading machine 300 includes sufficient memory storage (not shown in FIG. 3) to store characters or other data. In some examples, such memory can have stored therein a character table indicating, for a given set of characters, sensor output conditions (e.g., OCR output conditions, or magnetic head conditions) that result from scanning each of the given set of characters. The processor 318 can use this character table in character recognition logic in order to recognize each of the scanned characters. In some embodiments, the memory can include instructions for a parsing program, or the processor 318 can include instructions for a parsing program.

Figure 4:
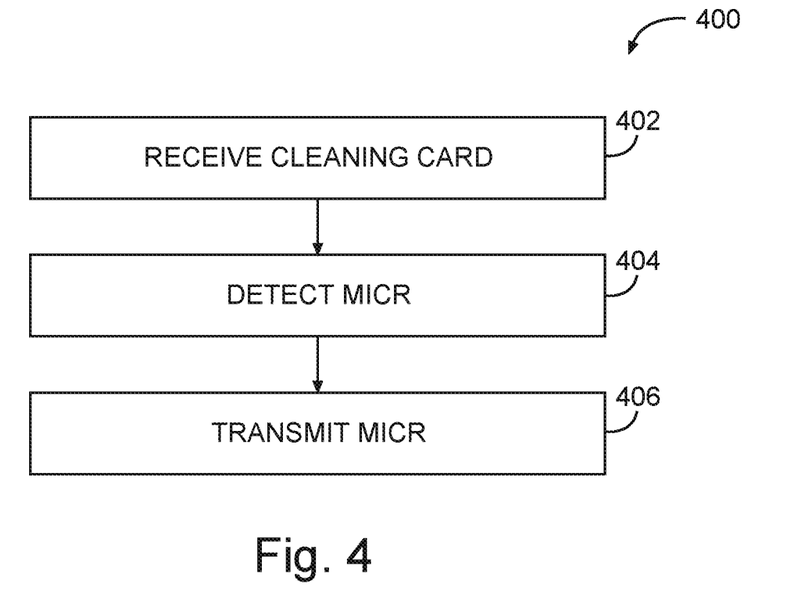
FIG. 4 illustrates a method of using a cleaning card, according to an example embodiment.

FIG. 4 illustrates a method 400 of using a cleaning card 100, according to an example embodiment. The check-reading machine 300, or components thereof can execute various operations of the method 400 and accordingly operations of the method 400 are discussed with reference to components of FIG. 3.

The example method 400 begins with operation 402 with receiving a cleaning card 100 via transport mechanism 302 of the check-reading machine 300. The cleaning card 100 can be configured to clean a component of the check-reading machine 300, such as reading components 306 including an optical lens 308, magnetic head 310, or any other component of the check-reading machine 300. For example, the cleaning card 100 can be comprised of a compressible textile or paper product of sufficiently small thickness that the cleaning card 100 can be received into the transport mechanism 302 and pass between internal surfaces of the check-reading machine 300, and of a sufficiently large thickness that the cleaning card 100 can effectively engage and clean desired internal surfaces when the cleaning card 100 is subjected to machine-direction tension. The cleaning card 100 can also include raised surfaces for cleaning or removing foreign objects from the appropriate internal surfaces and, in some embodiments, the cleaning card 100 will have a width and length dimension similar to that of a standard financial document (e.g., a check) that is fed through the check-reading machine 300 during the usual operation of the check-reading machine 300.

The example method 400 continues with operation 404 with detecting a set of MICR characters that have been printed on the cleaning card 100. If the ink used to print the MICR characters is a magnetic ink, the example method 400 can include detecting the MICR characters using a MICR reader, for example a reader that includes a magnetic head 310. Otherwise, if the ink is not magnetic, the magnetic head 310 may not be able to detect the MICR characters and the example method 400 can include using OCR and the optical lens 308 to detect the MICR characters.

As described earlier herein with reference to FIG. 2A, the position of the set of MICR characters can coincide with a routing field position of the cleaning card 100 as defined in in accordance with a standard of the ANSI X9 family of standards. These MICR characters can be used to determine whether the cleaning card 100 is a cleaning card, rather than some other sort of document (e.g., a check), after further processing or parsing of the MICR characters as described below.

The example method 400 continues with operation 406 with transmitting data related to the set of MICR characters from the check-reading machine 300 to an external device (e.g., the machine 314), responsive to detecting the set of MICR characters. Data transmission can, for example, include transmitting the set of MICR characters or transmitting data interpreted from the set of characters. In embodiments, the data can be transmitted through a USB connection. In embodiments, as described above, the check-reading machine 300 can perform additional parsing or interpretation operations before transmitting any data, including the MICR characters, to the external device.

The example method 400 can include further detection of other MICR characters or sets of characters, at other positions on the check cleaning card 100. For example, the example method 400 can include detecting MICR characters that includes identification information (e.g., a serial number, tracking number, etc.) of the cleaning card 100 at another position on the cleaning card 100. As described earlier herein, the position of this other set of MICR characters can coincide with an ON-US field of the cleaning card 100. The example method 400 can additionally include transmitting this other set of MICR characters from the check-reading machine 300 to an external device (e.g., the machine 314).

Figure 5:
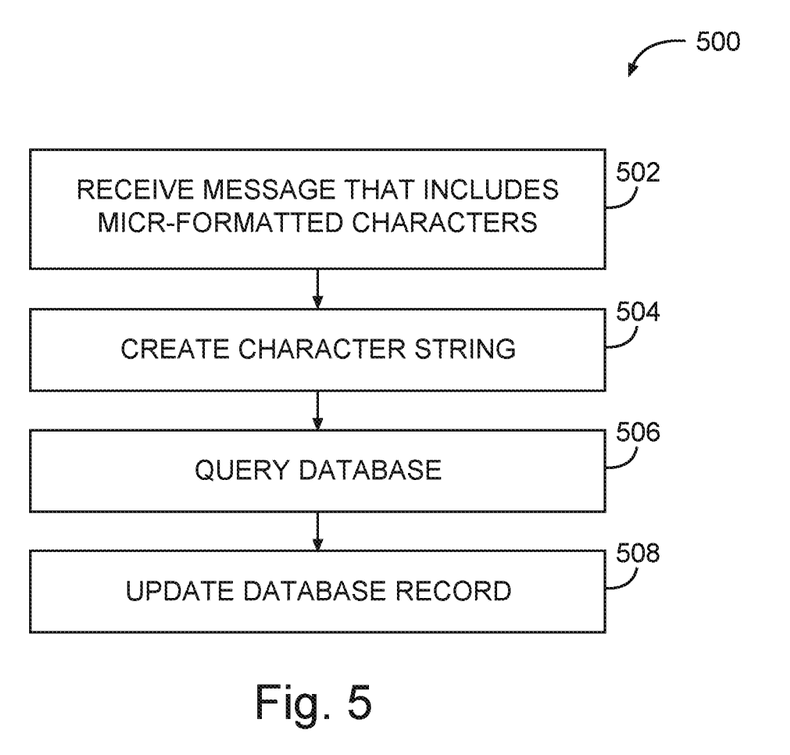
FIG. 5 illustrates a method of handling cleaning card data, according to an example embodiment.

FIG. 5 illustrates a method 500 of handling cleaning card 100 data, according to an example embodiment. The machine 314, or components thereof can execute various operations of the method 500.

The example method 500 begins with operation 502 by receiving a message from an external device (e.g., the check-reading machine 300 (FIG. 3)). The message can include MICR characters. However, as described earlier herein, in some embodiments, the check-reading machine 300 can further parse the MICR characters or include other interpretive information in messages.

The example method 500 continues with operation 504 by creating a character string from the MICR characters. In some embodiments, the external device can provide the character string generated from the MICR characters, while the machine 314 interprets that character string. In some embodiments, the external device can provide image picture data of one or more of the regions of the cleaning card 100 and the machine 314 can convert the image picture data to text data (including a character string) using character recognition software in the machine 314. However, these examples are not intended to limit example embodiments. On the contrary, various processing, parsing, or interpretive operations can be performed by either the external device or the machine 314.

The example method 500 continues with operation 506 by querying a database with the character string to determine whether the character string corresponds to a cleaning card 100. For example, a database table can include a field indicating identifiers for each possible cleaning card. If a match is found for the character string within that table, this indicates that a cleaning card 100 has been fed into the check-reading machine 300, otherwise a different type of document was fed into the check-reading machine 300. The database can be relational or non-relational in various embodiments.

The example method 500 continues with operation 508 by updating a database record to indicate that a cleaning operation has occurred at the external device (e.g., at the check-reading machine 300) upon determining that the character string corresponds to a cleaning card 100, as opposed to some other type of card or document (e.g., a check). The database record can include fields indicating the identification number of the cleaning card 100, the type of cleaning card 100, time information for when the cleaning card 100 was last used, check-reading machine 300 serial numbers, branch locations where the check-reading machine 300 is being used, teller identifier, etc. A software program executing on the machine 314 can use this database record and other similar database records to determine if cleaning operations are not being performed at sufficient intervals, and to provide alerts or other feedback accordingly.

For example, the database record can further include a time-referenced field that includes a time at which the last cleaning operation occurred, and the example method 500 can include providing an alert signal responsive to a determination that the check-reading machine 300 has not been cleaned for at least a threshold amount of time, based on the time-referenced field. The threshold can be set according to stored preferences (e.g., a user can set the preferences using a user interface presented on the machine 314). The user can additionally set different thresholds for different types of machines. For example, a different threshold can be set for a check-reading machine that is part of an Automated Teller Machine (ATM) versus a check-reading machine in a low-traffic branch office.

In embodiments, the machine 314 stores a count of a number of times that the cleaning card 100 was used for cleaning the check-reading machine 300 based a number of times the character string is received from the check-reading machine 300. If this count exceeds a threshold, the machine 314 can providing an alert signal to notify users that a new cleaning card 100 should be used. As above, different thresholds can be set for different check-reading machines 300.

Figure 6:
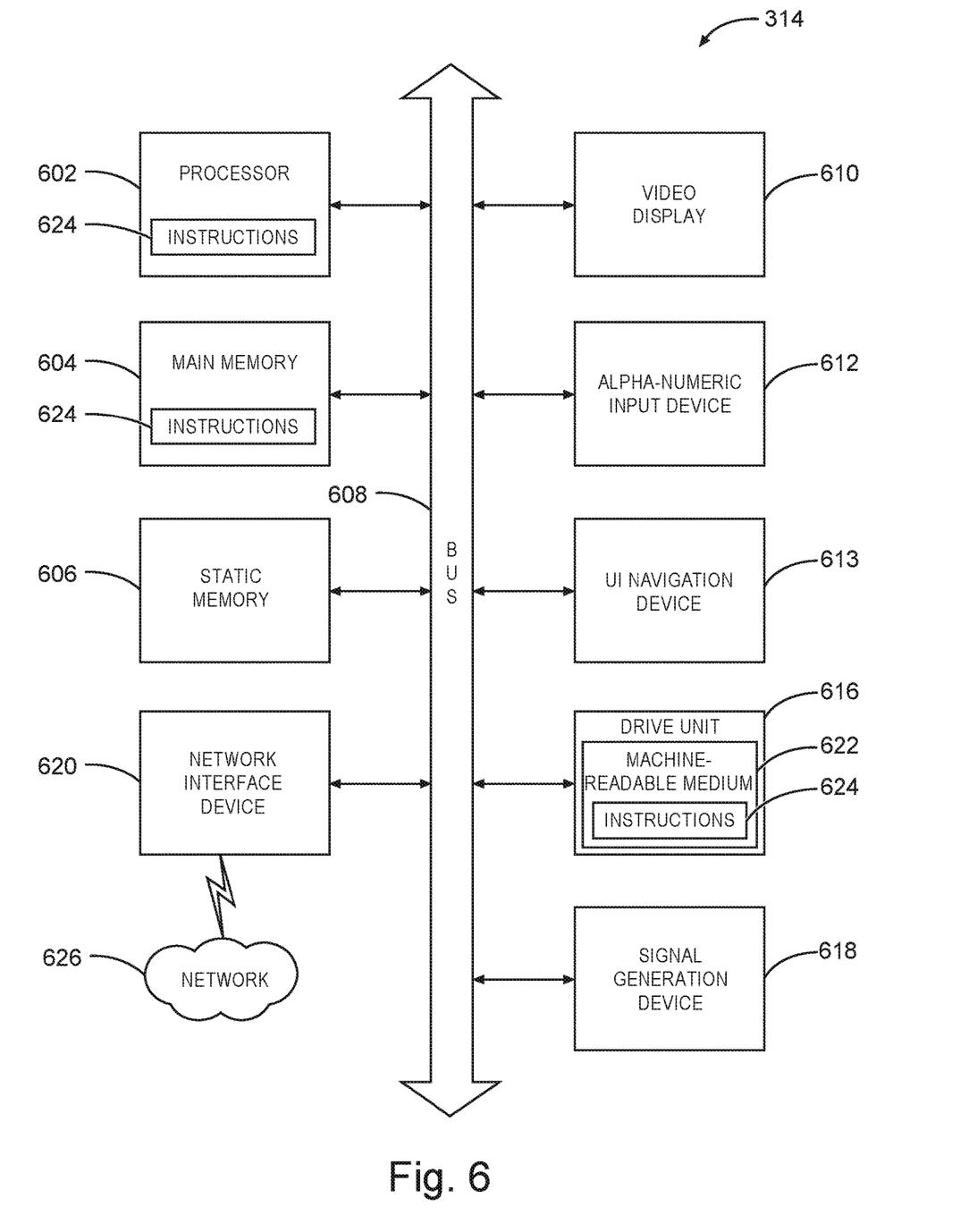
FIG. 6 is a block diagram illustrating an example machine upon which any one or more of the techniques (e.g., methodologies) discussed herein can be performed, according to an example embodiment.

FIG. 6 is a block diagram illustrating components of the machine 314, according to some example embodiments, able to read instructions from a machine-readable medium (e.g., a machine-readable storage medium) and perform any one or more of the methodologies discussed herein. Specifically, FIG. 6 shows a diagrammatic representation of the machine 314 in the example form of a computer system and within which instructions 624 (e.g., software) for causing the machine 314 to perform any one or more of the methodologies discussed herein can be executed.

In alternative embodiments, the machine 314 operates as a standalone device or can be connected (e.g., networked) to other machines. In a networked deployment, the machine 314 can operate in the capacity of a server machine or a client machine in a server-client network environment, or as a peer machine in a peer-to-peer (or distributed) network environment. The machine 314 can be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein. For example, the instructions 624 can cause the machine 314 to perform operations including receiving a message, from an external device (e.g., the check-reading machine 300), that includes MICR characters; creating a character string from the MICR characters; querying a database with the character string to determine that the character string corresponds to a cleaning card 100; and updating a database record to indicate that a cleaning operation has occurred at the external device (e.g., the check-reading machine 300) upon determining that the character string corresponds to the cleaning card 100.

The machine 314 includes at least one processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. Among other usages, the main memory 604 or static memory 606 can store database tables for querying operations related to cleaning cards 100 as described earlier herein. The machine 314 can further include a graphics display 610 (e.g., a plasma display panel (PDP), a light emitting diode (LED) display, a liquid crystal display (LCD), a projector, or a cathode ray tube (CRT)). The graphics display 610 can display any data associated with the check-reading machine 300, such as data regarding the last time the check-reading machine 300 was cleaned, or other status information, in addition to general financial institution data. The machine 314 can also include an alphanumeric input device 612 (e.g., a keyboard), a cursor control device 613 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 can also reside, completely or at least partially, within the main memory 604, within the processor 602 (e.g., within the processor's cache memory), or both, during execution thereof by the machine 314. Accordingly, the main memory 604 and the processor 602 can be considered as machine-readable media. The instructions 624 can be transmitted or received over a network 626 via the network interface device 620.

As used herein, the term "memory" refers to a machine-readable medium able to store data temporarily or permanently and can be taken to include, but not be limited to, random-access memory (RAMI), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 314 or the check-reading machine 300 (FIG. 3)), such that the instructions, when executed by one or more processors of the machine (e.g., processor 602 or 318 (FIG. 3)), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Certain embodiments are described herein as including logic or a number of components, modules, or mechanisms. Modules can constitute either software modules (e.g., code embodied on a non-transitory machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field programmable gate array (FPGA) or an ASIC. A hardware module can also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can beat least partially processor-implemented, a processor being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an application program interface (API)).

The performance of certain of the operations can be distributed among the one or more processors, not only residing within a single machine, but deployed across a number of machines. In some example embodiments, the one or more processors or processor-implemented modules can be located in a single geographic location (e.g., within a home environment, an office environment, or a server farm). In other example embodiments, the one or more processors or processor-implemented modules can be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities can take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like can refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance.

What is claimed is:

1. A method comprising:
   receiving a card via a transport mechanism of a check-reading machine, the card configured to clean a component of the check-reading machine;
   detecting a first set of magnetic ink character recognition (MICR) characters located at a first position on the card, the MICR characters indicating that the card is a cleaning card;
   detecting a second set of MICR characters at a second position on the cleaning card, where the second set of MICR characters includes identification information of the cleaning card; and
   responsive to detecting the set of MICR characters, transmitting data relating to the set of MICR characters from the check-reading machine to an external device.

2. The method of claim 1, wherein the position of the set of MICR characters coincides with a routing field position of the cleaning card as defined in in accordance with a standard of the American National Standards Institute (ANSI) X9 family of standards.

3. The method of claim 2, further comprising:
   transmitting the identification information from the check-reading machine to the external device.

4. The method of claim 3, wherein the second position coincides with an ON-US field of the cleaning card as defined in accordance with the standard of the ANSI X9 family of standards.

5. The method of claim 1, wherein detecting comprises:
   detecting using a MICR reader when the MICR characters have been printed using magnetic ink, and detecting using optical character recognition (OCR) otherwise.

6. The method of claim 1, wherein transmitting the data relating to the MICR characters from the check-reading machine to the external device comprises transmitting the data through a Universal Serial Bus (USB) connection.

7. A system comprising:
   a check-reading machine including a transport mechanism configured to receive a card;
   a reading component configured to:
      detect a first set of magnetic ink character recognition (MICR) characters located at a first position on the card, the MICR characters indicating that the card is a cleaning card;
      detect a second set of MICR characters at a second position on the cleaning card, where the second set of MICR characters includes identification information of the cleaning card;
   and
   a memory configured to store tracking information of the cleaning card.

8. The system of claim 7, wherein the reading component is further configured to detect at least one of a magnetic stripe, a bar code, a radio frequency identifier (RFID) tag, or a contactless smart card.

9. The system of claim 7, wherein the reading component includes at least one of an optical lens, a magnetic head, a magnetic stripe reader, or a wireless receiver assembly.

10. The system of claim 7, further comprising a communication interface configured to transmit tracking information of the cleaning card.

11. The system of claim 10, wherein the communication interface includes at least one of a Universal Serial Bus (USB) interface, an Ethernet interface, a Wireless Fidelity (Wi-Fi) interface, or a Bluetooth interface.

12. The system of claim 10, wherein the communication interface is further configured to receive control information for controlling the check-reading machine.

13. A non-transitory machine-readable medium including instructions that, when implemented on a processor, cause the processor to perform operations including:
   receiving a card via a transport mechanism of a check-reading machine, the card configured to clean a component of the check-reading machine;
   detecting a first set of magnetic ink character recognition (MICR) characters located at a first position on the card, the MICR characters indicating that the card is a cleaning card;
   detecting a second set of MICR characters at a second position on the cleaning card, where the second set of MICR characters includes identification information of the cleaning card; and
   responsive to detecting the set of characters, encoding data relating to the set of characters and transmitting the data to an external device.

14. The non-transitory machine-readable medium of claim 13, wherein the position of the set of characters coincides with a routing field position of the cleaning card as defined in in accordance with a standard of the American National Standards Institute (ANSI) X9 family of standards.

15. The non-transitory machine-readable medium of claim 14, wherein the operations further comprise
   encoding the identification information for transmission to the external device.

16. The non-transitory machine-readable medium of claim 15, wherein the second position coincides with an ON-US field of the cleaning card as defined in accordance with the standard of the ANSI X9 family of standards.

17. The non-transitory machine-readable medium of claim 13, wherein encoding the data includes configuring a message in accordance with a standard of one or more of a Universal Serial Bus (USB) standard, an Ethernet standard, a Wireless Fidelity (Wi-Fi) standard, or a Bluetooth standard.

18. The non-transitory machine-readable medium of claim 13, wherein the set of characters include magnetic ink character recognition (MICR) characters.

* * * * *